United States Patent
Ponting et al.

(10) Patent No.: US 10,354,654 B2
(45) Date of Patent: Jul. 16, 2019

(54) CONVERSATION STRUCTURE ANALYSIS (71) Applicant: Avaya Inc., Basking Ridge, NJ (US)

(72) Inventors: Keith Ponting, Worcestershire (GB); Rein Sikveland, Nottingham (GB); David Zeitlyn, Oxford (GB)

(73) Assignee: Avaya Inc., Basking Ridge, NJ (US)

(*) Notice: Subject to any disclaimer, the term of this patent is extended or adjusted under 35 U.S.C. 154(b) by 57 days.

(21) Appl. No.: 14/301,901

(22) Filed: Jun. 11, 2014

(65) Prior Publication Data
US 2015/0364130 A1 Dec. 17, 2015

(51) Int. Cl.
G10L 17/00 (2013.01)
G10L 25/03 (2013.01)
G10L 25/48 (2013.01)

(52) U.S. Cl.
CPC .............. *G10L 17/00* (2013.01); *G10L 25/03* (2013.01); *G10L 25/48* (2013.01)

(58) Field of Classification Search
None
See application file for complete search history.

(56) References Cited

U.S. PATENT DOCUMENTS

| 2010/0166158 A1* | 7/2010 | Costello | G10L 15/22 379/88.04 |
| 2011/0307257 A1* | 12/2011 | Pereg | G06Q 10/063 704/251 |
| 2013/0121580 A1* | 5/2013 | Chen | G06Q 10/063 382/182 |

* cited by examiner

Primary Examiner — Richa Mishra (57) ABSTRACT

Embodiments disclosed herein provide systems, methods, and computer readable media for analyzing a conversation between a plurality of participants. In a particular embodiment, a method provides determining a first speaker from the plurality of participants and determining a second speaker from the plurality of participants. The method further provides determining a first plurality of turns comprising portions of the conversation when the first speaker is speaking and determining a second plurality of turns comprising portions of the conversation when the second speaker is speaking The method also provides determining per-turn statistics for turns of the first and second pluralities of turns and identifying phases of the conversation based on the per-turn statistics.

20 Claims, 6 Drawing Sheets

CONVERSATION STRUCTURE ANALYSIS

TECHNICAL BACKGROUND

A single call center can accept and/or make hundreds, if not thousands, of calls each day. Each accepted call results in at least one conversation between the customer and one or more call center agents. Information about these conversations may be desirable to an operator of the call center so that the operator can improve the services provided by the call center. Such information may be easily obtainable for a conversation by a human listening to the conversation. However, the number of conversations handled by the call center makes human analysis of every conversation unachievable.

While a speech recognition system may be able to recognize words spoken by the participants in a conversation, the words spoken are not necessarily indicative of the quality of the conversation as a social interaction. Moreover unconstrained speech recognition requires significant computational resource and, particularly if one participant speaks with an accent or the acoustic conditions are poor, the reliability of words generated from the speech recognition may be less than desirable. Accordingly, analysis of a conversation's quality may be better determined using means other than speech recognition.

OVERVIEW

Embodiments disclosed herein provide systems, methods, and computer readable media for analyzing a conversation between a plurality of participants. In a particular embodiment, a method provides determining a first speaker from the plurality of participants and determining a second speaker from the plurality of participants. The method further provides determining a first plurality of turns comprising portions of the conversation when the first speaker is speaking and determining a second plurality of turns comprising portions of the conversation when the second speaker is speaking The method also provides determining per-turn statistics for turns of the first and second pluralities of turns and identifying phases of the conversation based on the per-turn statistics.

In some embodiments, determining the per-turn statistics includes determining floor-transfer times between turns of the first plurality of turns and turns of the second plurality of turns and including the floor transfer times in the per-turn statistics.

In some embodiments, determining the per-turn statistics includes determining within-floor times for the first and second pluralities of turns and including the within floor times in the per-turn statistics.

In some embodiments, determining the per-turn statistics includes determining within-floor speech ratios for the first and second pluralities of turns, wherein each within-floor speech ratio comprises a ratio of speech time per turn to pause time per turn and including the within-floor speech ratios in the per-turn statistics.

In some embodiments, determining the per-turn statistics includes determining average within-floor pause durations and maximum within-floor pause durations for the first and second pluralities of turns and including the average within-floor pause durations and the maximum within-floor pause durations in the per-turn statistics.

In some embodiments, determining the per-turn statistics includes determining average within-floor speech durations and maximum within-floor speech durations for the first and second pluralities of turns and including the average within-floor pause durations and the maximum within-floor pause durations in the per-turn statistics.

In some embodiments, identifying phases of the conversation based on the per-turn statistics includes applying a statistical model to the per-turn statistics to determine when the conversation moves from one phase to a subsequent phase.

In some embodiments, states of the statistical model correspond to phases of the conversation.

In some embodiments, the statistical model comprises a hidden Markov model.

In some embodiments, identifying the phases of the conversation is further based on workstation activity of the first participant.

In another embodiment, a conversation analysis system is provided for analyzing a conversation between a plurality of participants. The conversation analysis system includes a storage system configured to store the conversation and a processing system configured to determine a first speaker from the plurality of participants and determine a second speaker from the plurality of participants. The processing system is further configured to determine a first plurality of turns comprising portions of the conversation when the first speaker is speaking and determine a second plurality of turns comprising portions of the conversation when the second speaker is speaking The processing system is also configured to determine per-turn statistics for turns of the first and second pluralities of turns and identify phases of the conversation based on the per-turn statistics.

In yet another embodiment, a computer readable storage media having instructions stored thereon for analyzing a conversation between a plurality of participants is provided. The instructions, when executed by a processing system, direct the processing system to determine a first speaker from the plurality of participants and determine a second speaker from the plurality of participants. The instructions further direct the processing system to determine a first plurality of turns comprising portions of the conversation when the first speaker is speaking and determine a second plurality of turns comprising portions of the conversation when the second speaker is speaking The instructions also direct the processing system to determine per-turn statistics for turns of the first and second pluralities of turns and identify phases of the conversation based on the per-turn statistics.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
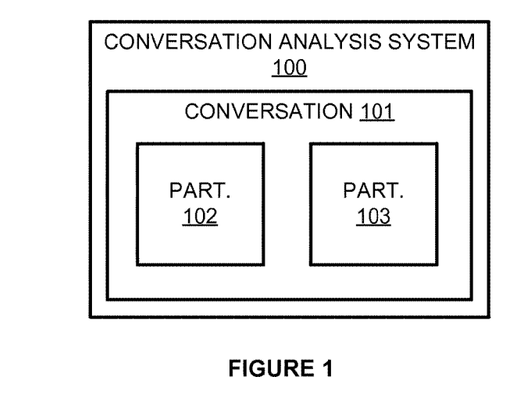
FIG. 1 illustrates a conversation analysis system for analyzing a conversation between a plurality of participants.

FIG. 1 illustrates conversation analysis system 100 that includes processing circuitry and a memory to store at least a portion of conversation 101. Conversation analysis system 100 processes conversation 101 between participant 102 and participant 103 to determine a characterization for the flow of the conversation. Conversation 101 is a voice conversation and, therefore, includes audio information representing what was spoken by each of participants 102 and 103. The audio information may include a digital or analog representation of the each participants voice during conversation 101. The audio information may be generated by conversation analysis system 100 or may be received from another system that captured the conversation between participants 102 and 103. It should be understood that, while conversation 101 includes only two participants, there may be more than two participants in a particular conversation.

Figure 2:
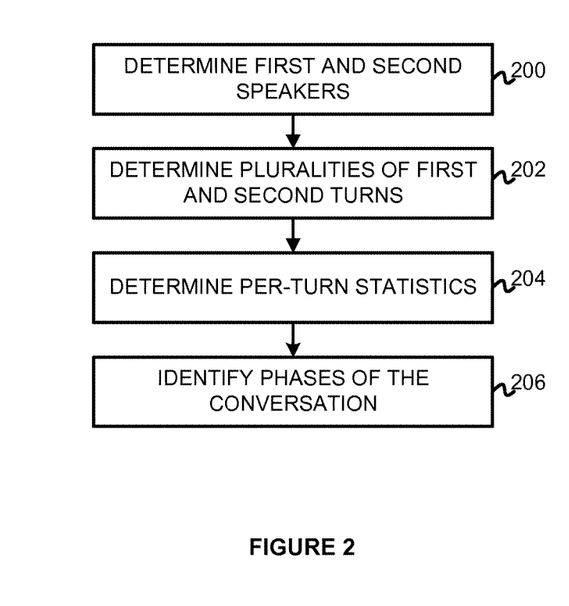
FIG. 2 illustrates a method for analyzing a conversation between a plurality of participants.

FIG. 2 illustrates method of analyzing a conversation between a plurality of participants. In particular, conversation analysis system 100 may use the method of FIG. 2 to analyze conversation 101. The method includes determining a first speaker from the plurality of participants (e.g. participants 102-103) and determining a second speaker from the plurality of participants (step 200). The method further provides determining a first plurality of turns comprising portions of the conversation when the first speaker is speaking and determining a second plurality of turns comprising portions of the conversation when the second speaker is speaking (step 202). The method then provides determining per-turn statistics for turns of the first and second pluralities of turns (step 204) and identifying phases of the conversation based on the per-turn statistics (step 206).

In a particular example concerning conversation 101 from FIG. 1, at step 200, conversation analysis system 100 determines that participant 102 is one speaker in conversation 101 and participant 103 is another speaker in conversation 101. At step 202, conversation analysis system 100 determines a plurality of turns when participant 102 is speaking and a plurality of turns when participant 103 is speaking At step 204, conversation analysis system 100 determines per-turn statistics for the turns of participant 102 and the turns of participant 103. Conversation analysis system 100 can then determine phases of conversation 101 based on the per-turn statistics as step 206.

The phases may be identified in real-time based on audio received by conversation analysis system 100 as the conversation proceeds or at a later time based on prerecorded audio information for the conversation. The conversation need not be completed before conversation analysis system 100 begins processing the prerecorded audio information for the conversation.

In various embodiments, any method of differentiating between speakers in a captured audio conversation may be used in the above method. In some examples, conversation 101 comprises mono audio signal and one or more diarization techniques may be used to differentiate between speakers in a conversation. In other examples, conversation 101 comprises a multichannel audio signal and one or more voice activity detection techniques may be used to differentiate between speakers in a conversation.

Typically, participants in a conversation will take turns allowing each other to speak. Thus, once the speakers have been differentiated, the conversation can be divided into turns when each of the speakers is speaking One turn may be differentiated from another turn when one speaker starts and another speaker begins. Additionally, if one speaker stops speaking and another speaker does not speak before the one speaker starts speaking again, then those two periods of time when the one speaker is speaking may be considered separate turns. That is, if the amount of time between the two periods of speaking is great enough (e.g. greater than a threshold amount of time), then those two periods are considered separate turns rather then merely a single turn having a pause therein.

After identifying at least a portion of the turns or as the turns are being identified, per-turn statistics are determined, which may include floor-transfer times, within-floor times, within-floor speech ratios, average within-floor pause durations, maximum within-floor pause durations, average within-floor speech durations, maximum within-floor speech durations, or any other statistic that can be determined for speaking turns without needing to know what is actually said—including combinations thereof.

Floor-transfer times comprise the times between turns of different speakers. For example, a floor-transfer time is the time that elapses between a turn of participant 102 ending and the subsequent turn of participant 103 beginning It is possible for a floor-transfer time to be negative if one participant begins speaking before another speaker finishes.

Within-floor times comprise time periods within which there are no floor transfers. Thus, a within-floor time for participant 102 would equate to a time period from when participant 102 begins speaking for a turn to a time when participant 103 begins speaking for a turn. It should be understood that the time period may include multiple turns for participant 102 but those turns are still included within the within-floor time as long as the floor does not transfer to a turn of participant 103 therein.

Within-floor speech ratios comprise proportions of speech for each speaker turn and do not include any gap in speech that may exist when the speaking floor transfers to another participant. For example, a turn of participant 102 lasts 10 seconds. The time when participant 102 is speaking during this turn may be 8 seconds with the remaining 2 seconds being filled by pauses or otherwise devoid of speech. Accordingly, the within-floor speech ratio for that turn is 4:1. Alternatively, the speech ratio could be expressed as speech time to total time, which in this example is 4:5. It should be understood that within-floor speech ratios may be expressed in other ways, such as percentages, without detracting from their usefulness.

Average within-floor pause durations comprise the average length of time that pauses in speech last within respective turns and do not include any gap in speech that may exist when the speaking floor transfers to another participant. For example, if a turn includes 3 pauses lasting 0.6 seconds, 1.1 seconds, and 1.3 seconds, respectively, the average within-floor pause duration for that turn is 1 second. Similarly, maximum within-floor pause durations comprise the maximum pause duration for each respective turn. Using the turn in the above example, the maximum pause duration for the 3 pauses of that turn is 1.3 seconds.

Average within-floor speech durations comprise the average length of time that speech lasts between pauses within respective turns and do not include any gap in speech that may exist when the speaking floor transfers to another participant. For example, if a turn includes 5 periods of speech lasting 4 seconds, 8 seconds, 3.5 seconds, 13 seconds, and 11.2 seconds, respectively, the average within-floor speech duration for that turn is 7.94 seconds. Likewise, maximum within-floor speech durations comprise the maximum speech duration for each respective turn. Using the turn in the above example, the maximum speech duration for the 5 periods of that turn is 13 seconds.

In some embodiments, the per-turn statistics may be transformed to improve the similarity to a Gaussian distribution. That is, outliers in the statistics may be truncated so that the outliers do not adversely affect the determination of conversation phases. For example when using diarization of a mono signal, overlap between speakers corresponds to a negative gap, which may only be determined as a gap less than or equal to zero so that there are many zeros in the measured floor-transfer times. Likewise, a turn may have no internal pauses, which would result in a 1 for that turn's within-floor speech ratio and a 0 for that turn's within-pause ratio. Turns with these characteristics may require special processing to ensure proper determination of conversation phases.

To determine the phases, a statistical model may be applied to the per-turn statistics. While many possible statistical models may be used, some embodiments may use hidden Markov modeling, wherein states of the hidden Markov model each correspond to a different phase of a conversation. Thus, if the per-turn statistics for turns within a particular period of the conversation at least substantially match the per-turn statistics described by a state of the model, then that period of the conversation is identified as a phase of the conversation represented by that state of the model.

Models used by conversation analysis system 100 may be trained based on conversations that have been pre-labeled, possibly by a human operator, with call phases. That is, the phase information that identifies time periods of the conversations corresponding to each respective phase is provided. Conversation analysis system 100 (or another system assigned with generating the models) then determines per-turn statistics for the pre-labeled conversations and develops a model state for each phase based on the per-turn statistics of turns within each respective pre-labeled phase.

In alternative examples, the models may be generated using a form of embedded training known in the speech recognition field. For embedded training, the system generating the model is merely told the possible sequences of phases for each call and the training algorithm implicitly determines the phase sequence and boundaries for each training call. In speech recognition, it is common to use a "flat start", in which the models of the parameter distributions are initially unspecified. In the case of truncated distributions it may be beneficial instead to use a "mixture distribution" and provide initial estimates so that the truncation value (zero in the case of gap between speakers' turns) is explicitly picked up by the initial estimates for one of the mixture components. It may also be beneficial to model turn pairs, so that, for example, in an agent-led conversation the statistics for an agent's turn and for the following customer turn are concatenated to form a single, longer, parameter vector.

In some embodiments, conversation analysis system 100 may use information outside of the turns of conversation 101 to identify the phases of conversation 101. For example, conversation analysis system 100 may use desktop or workstation activity of one of the participants 102-103. Specifically, one of the participants may be an agent for a call center and the other may be a customer. Thus, a desktop activity may comprise a particular customer record being brought up by the agent on his workstation, a security answers screen being dismissed, or any other possible activity that a call center agent could perform—including combinations thereof.

In some embodiments, other call phases outside of conversation 101 may also be identified either from workstation activity or activities performed by other systems. These other call phases may include the various prompts and spoken responses in an interactive voice response (IVR) system before the customer and the agent are connected or after they are disconnected, such interactions would be stored in association with conversation 101 for analysis by conversation analysis system 100.

Advantageously, the embodiments discussed above allow for phases of a conversation to be identified without the need for speech recognition. Specifically, analyzing the per-turn statistics allows for identifying phases of a conversation based on occurrences of speech by participants in a conversation rather than on what words are actually spoken by the participants.

Figure 3:
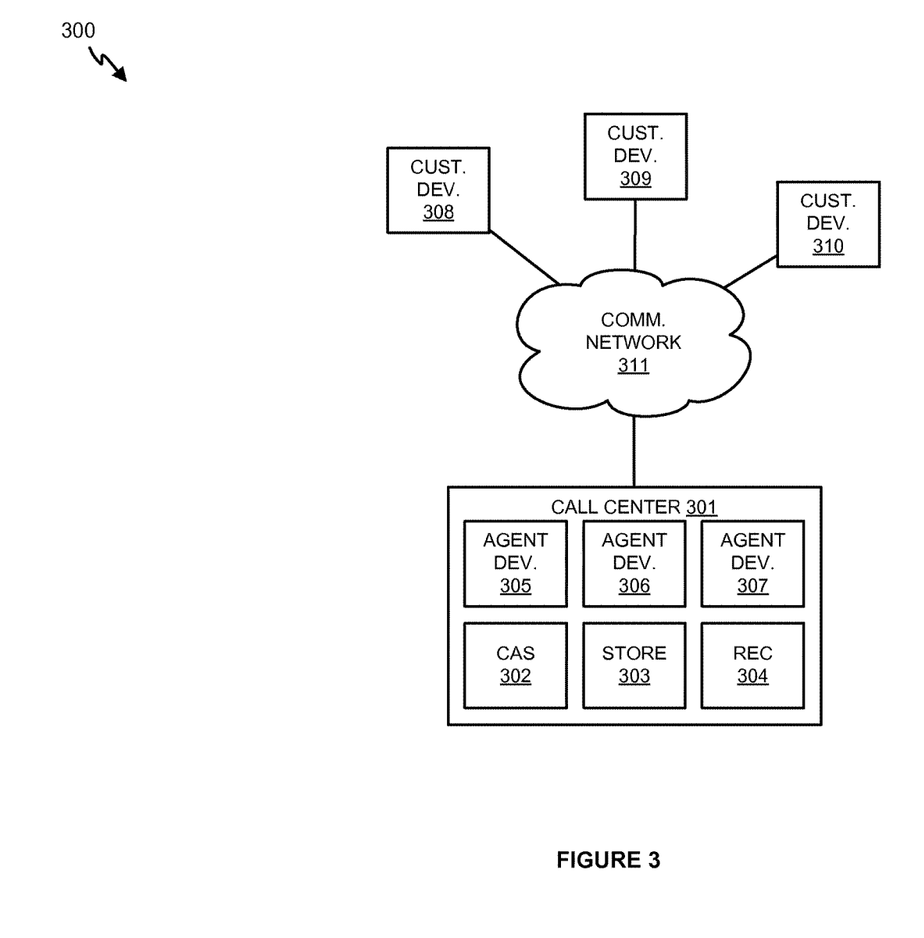
FIG. 3 illustrates a call center environment for analyzing a conversation between a plurality of participants.

FIG. 3 illustrates call center environment 300. Call center environment 300 includes call center 301, which includes conversation analysis system 302, conversation store 303, conversation recorder 304, and agent devices 305-307. Call center environment 300 further includes customer devices 308-310 and communication network 311. The elements 302-307 of call center 301 may be collocated at a common facility or may be distributed across multiple locations in communication over communication network 311 or otherwise. Call center 301 may also include additional systems and devices, such as a call distributor system, that are not shown for clarity.

Agent devices 305-307 and customer devices 308-310 each comprise communication circuitry for exchanging communications over communication network 311. Each of devices 305-310 may also include a user interface, memory device, software, processing circuitry, or some other communication components. Each of devices 305-310 may be a telephone, computer, e-book, mobile Internet appliance, wired network interface card, wireless network interface card, media player, game console, or some other communication apparatus—including combinations thereof.

Conversation analysis system 302 comprises a computer system and communication interface. Conversation analysis system 302 may also include other components such as a user interface, router, server, data storage system, and power supply. Conversation analysis system 302 may reside in a single device or may be distributed across multiple devices. Conversation analysis system 302 is shown externally to conversation store 303 and conversation recorder 304, however, conversation analysis system 302 may be incorporated with one or more of these other systems.

Conversation recorder 304 comprises a computer system and communication interface. Conversation recorder 304 may also include other components such as a user interface, router, server, data storage system, and power supply. Conversation recorder 304 may reside in a single device or may be distributed across multiple devices. Conversation recorder 304 is shown externally to conversation store 303 and conversation analysis system 302, however, conversation recorder 304 may be incorporated with one or more of these other systems.

Conversation store 303 comprises a communication interface and a data storage system. The data storage system may include one or more hard disk drives, flash memory, magnetic tape drives, or any other type of non-transitory storage media. Conversation store 303 may reside in a single device or may be distributed across multiple devices. Conversation store 303 is shown externally to conversation recorder 304 and conversation analysis system 302, however, conversation store 303 may be incorporated with one or more of these other systems.

Communication network 311 comprises network elements that provide communications services to customer devices 308-310 and call center 301. Communication network 311 may comprise switches, wireless access nodes, Internet routers, network gateways, application servers, computer systems, communication links, or some other type of communication equipment—including combinations thereof. Communication network 311 could use various communication protocols, such as Time Division Multiplex (TDM), Internet Protocol (IP), Ethernet, communication signaling, Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other communication format—including combinations thereof.

Figure 4:
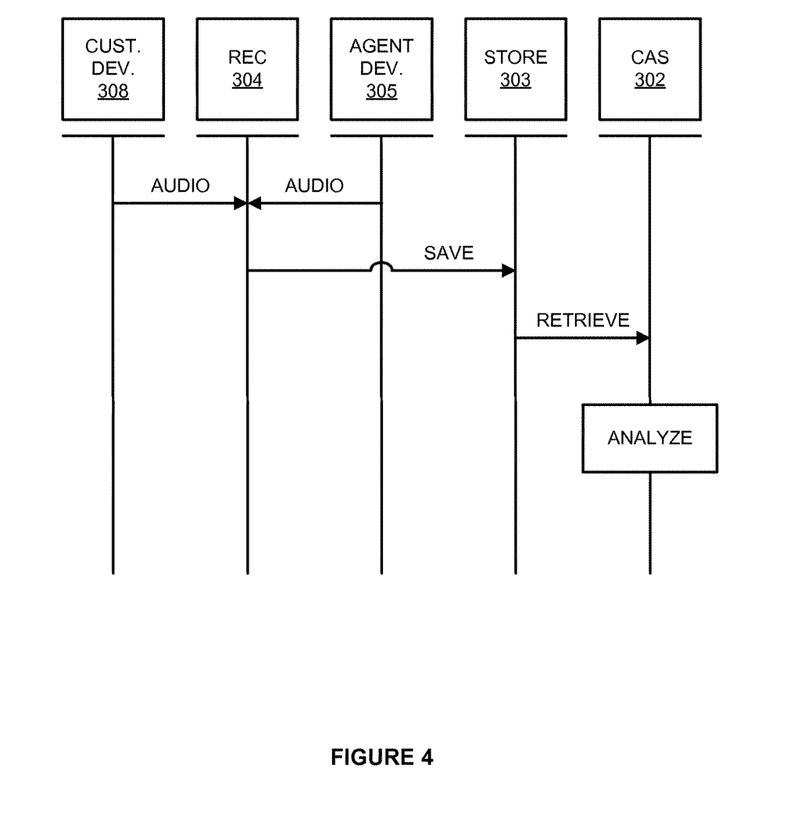
FIG. 4 illustrates a method of operating the call center environment for analyzing a conversation between a plurality of participants.

FIG. 4 is a sequence diagram illustrating an operation of call center environment 300 to analyze a conversation between a plurality of participants. In operation, a customer operates customer device 308 to place a call in order to speak with an agent at call center 301. The customer may want to make a purchase, ask a question, or any other reason for a customer/agent interaction. In this example, the call from customer device 308 is routed to agent device 305 and a conversation between the customer and an agent operating agent device 305 commences.

During the conversation, conversation recorder 304 receives audio captured by customer device 308 for the customer's side of the conversation. Similarly, conversation recorder 304 also receives audio captured by agent device 305 for the agent's side of the conversation. The audio may be received as analog or digital audio information representing the audible elements (e.g. voices) of the conversation. The audio may be received in real time during the conversation or may be received at some other time, such as recorded by agent device 305 and transferred to conversation recorder 304 after the conversation ends. Conversation recorder 304 may be an intermediate system in the communication path between customer device 308 and agent device 305 in order to receive the audio information for both sides of the conversation. Alternatively, conversation recorder 304 may receive audio information from another system or device, including audio information directly from one or more of devices 308 and 305. The audio information may be received for the conversation as a whole or may be received individually for the conversation participants (i.e. the customer and the agent).

Regardless of how the audio information is received, conversation recorder 303 saves the audio information in conversation store 303 so that the audio information for the conversation can be accessed by conversation analysis system 302. Along with the audio information, conversation recorder 304 may also store metadata for the conversation, such as identities of one or more of the conversation participants, general subject matter of the conversation (e.g. tech support, sales, etc.), more specific subject matter (e.g. a particular support issue, a particular product for sale, etc.), time the conversation occurred, or any other information that may be known about a conversation.

After the conversation is stored, conversation analysis system 302 retrieves the audio information from conversation store 304 and analyses the conversation audio to identify phases of the conversation as described herein. Specifically, conversation analysis system 302 identifies the customer operating customer device 308 as a first speaker on the conversation and the agent operating agent device 305 as a second speaker on the conversation. Conversation analysis system 302 may not know the specific identities of the two speakers during the aforementioned step, but at least is able to identify two distinct speakers from the conversation audio.

Either after identifying the two speakers or concurrently with identifying the two speakers, conversation analysis system 302 determines turns wherein each of the speakers is speaking From the turns, conversation analysis system 302 can determine per-turn statistics for the turns. Conversation analysis system 302 then applies a statistical model to the per-turn statistics to identify phases of the conversation. Specifically, when the per-turn statistics for a portion of the conversation conform to a state of the statistical model, that portion of the conversation is determined by conversation analysis system 302 to be in the conversation phase associated with that state of the statistical model.

Phase information identified for the identified phases of the conversation is then stored in a memory for conversation analysis system 302. The information may include time stamps indicating the boundaries during the conversation where one phase changes to the next, a label for the phase indicated by the boundaries, or any other information that may be useful for indicating the phases of the conversation. Alternatively, the phase information may be stored in conversation store 303 as part of the metadata for the conversation or otherwise associated with the conversation.

The phase information may be stored along with other phase information determined for other conversations so that the phase information for the conversations can be further analyzed. For example, the amount of time that each conversation spends in a given phase may be compared to other conversations or, once the phases of a conversation have been identified, further analysis of conversations may be performed on particular phases rather than the conversation as a whole. Other forms of analysis are also possible. The further analysis may be performed by conversation analysis system 302, by some other computer system with access to the phase information, or presented to a human operator for analysis.

Figure 5:
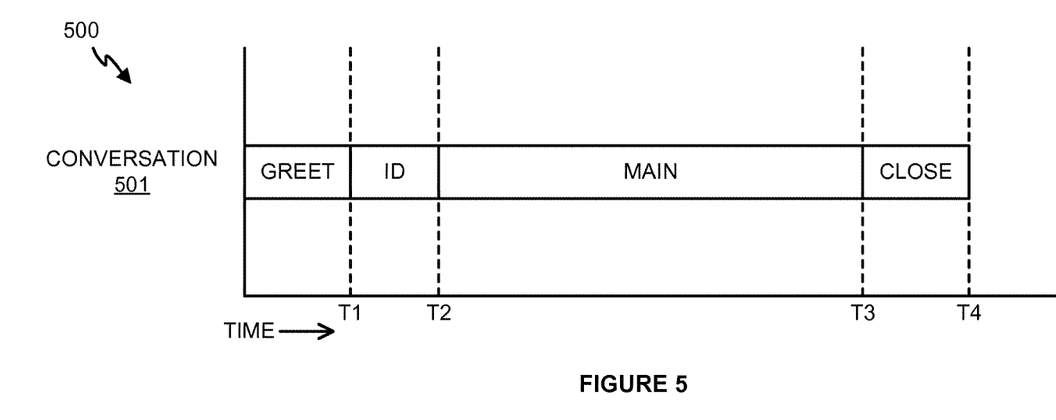
FIG. 5 illustrates a timeline of a conversation after analysis.

FIG. 5 illustrates a timeline 500 of a conversation 501 after analysis. In particular, conversation 501 represents an example of the conversation discussed above with respect to FIG. 4. In this example, conversation analysis system 302 identifies four phases of conversation 501 and indicates those phases in corresponding phase information. The first phase is a greeting phase where the two participants, the agent and the customer, exchange greetings during the conversation's outset. The phase information indicates that this greeting phase lasts from the beginning of the conversation to time T1. Following the greeting phase, the conversation enters an identification phase where the agent and the customer identify themselves. Specifically, the customer may provide information to the agent so that the agent can confirm that the customer is the person who he or she asserts. The phase information indicates that the identification phase lasts from time T1 to time T2.

Once the participants have identified themselves, the conversation moves into a main phase. The main phase may be where any reasons for the customer calling call center 301, or vice versa, are discussed, such as a sales inquiry, tech support, or any other topic. The phase information indicates that this main phase lasts from time T2 to time T3. After the main phase, conversation 501 enters a closing phase where the participants wrap up the call before disconnecting. The phase information indicates that the closing phase progresses from time T3 until the conversation ends at time T4.

It should be understood that, while conversation analysis system 302 has identified four phases within conversation 501, additional or different types of phases may be possible including more specific phases than those provided in timeline 500.

Figure 6:
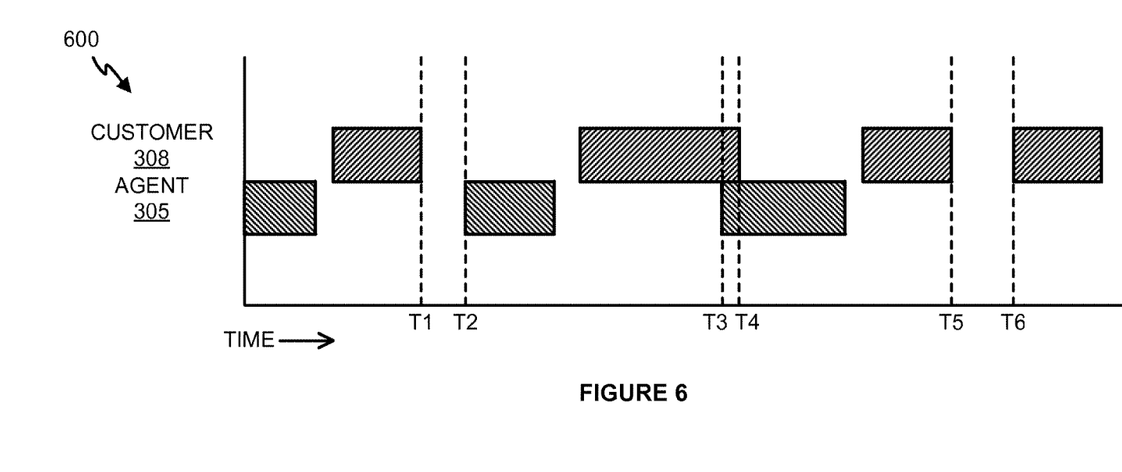
FIG. 6 illustrates a timeline of a conversation for analysis.

FIG. 6 illustrates a timeline 600 of a conversation for analysis. In particular, timeline 600 represents an example of at least a portion of the conversation discussed above with respect to FIG. 4. Thus, the upper bars of timeline 600 correspond to turns when the customer operating customer device 308 is speaking and the lower bars of timeline 600 correspond to turns when the agent operating agent device 305 is speaking. In this example, conversation analysis system 302 identifies floor-transfer times between when turns of the agent end and turns of the customer begin and vice versa.

Specifically, timeline 600 illustrates that five floor transfers occur during the illustrated portion of the conversation. In four of the five floor transfers, the floor-transfer times are positive values. For example, one of the positive value floor-transfer times is illustrated as the time elapsed between time T1, when the customer finishes a turn, and time T2, when the agent begins a turn. Alternatively, one of the five floor transfers comprises a negative floor-transfer time. That is, the agent begins speaking for a turn at time T3 before the customer finishes a turn at time T4. It should be understood that the time period between time T5 and time T6 is not a floor-transfer time because the floor does not transfer to the agent between the two turns of the customer.

Figure 7:
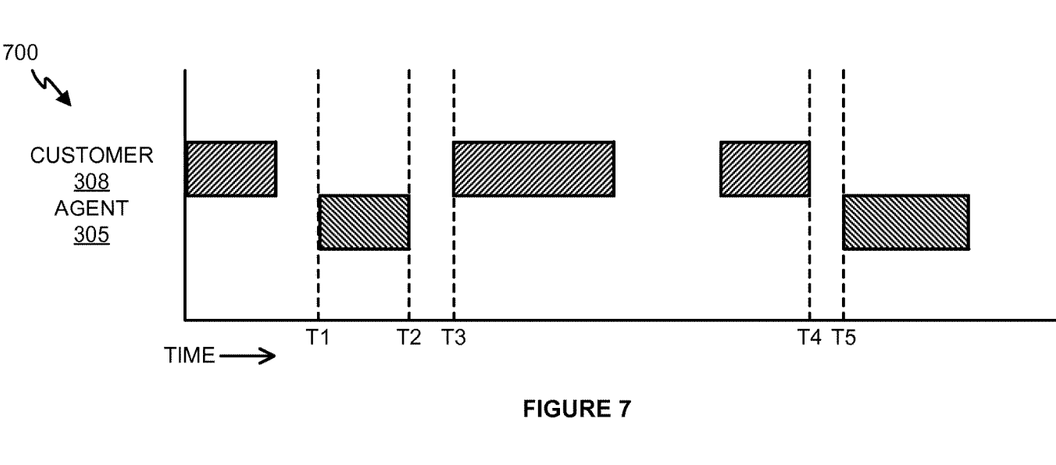
FIG. 7 illustrates a timeline of a conversation for analysis.

FIG. 7 illustrates a timeline 700 of a conversation for analysis. In particular, timeline 700 also represents an example of at least a portion of the conversation discussed above with respect to FIG. 4. Thus, the upper bars of timeline 700 correspond to turns when the customer operating customer device 308 is speaking and the lower bars of timeline 700 correspond to turns when the agent operating agent device 305 is speaking. In this example, conversation analysis system 302 determines within-floor times for the turns of the conversation.

In a particular, two measures of within-floor times are illustrated on timeline 700. Conversation analysis system 302 determines that the floor transfers from the customer to the agent when the agent's turn begins at time T1. That turn ends at time T2 but conversation analysis system 302 does not calculate the within-floor time for this period of the agent having the floor until it is determined that the floor has transferred. That is, upon conversation analysis system 302 recognizing that the customer begins a turn at time T3, conversation analysis system 302 determines that the floor has transferred and the within-floor time before the floor transfer should be measured from time T1 to time T2. Conversation analysis system 302 does not include the time between time T2 and time T3 because floor-transfer time is not included in within-floor time.

Similarly, upon determining that the floor transferred back to the customer at time T3, conversation analysis system 302 measures the within-floor time for the customer in this portion of the conversation from time T3. Conversation analysis system 302's measurement of the within-floor time ends at time T4, which is determined once the floor transfers back to the agent at time T5. This within-floor time includes two turns of the customer due to the lack of a floor transfer between times T3 and T4.

While not discussed in the above example, the two turns before and after times T1-T4 may also have their within-floor times determined by conversation analysis system 302 and included within the per-turn statistics for analysis.

Figure 8:
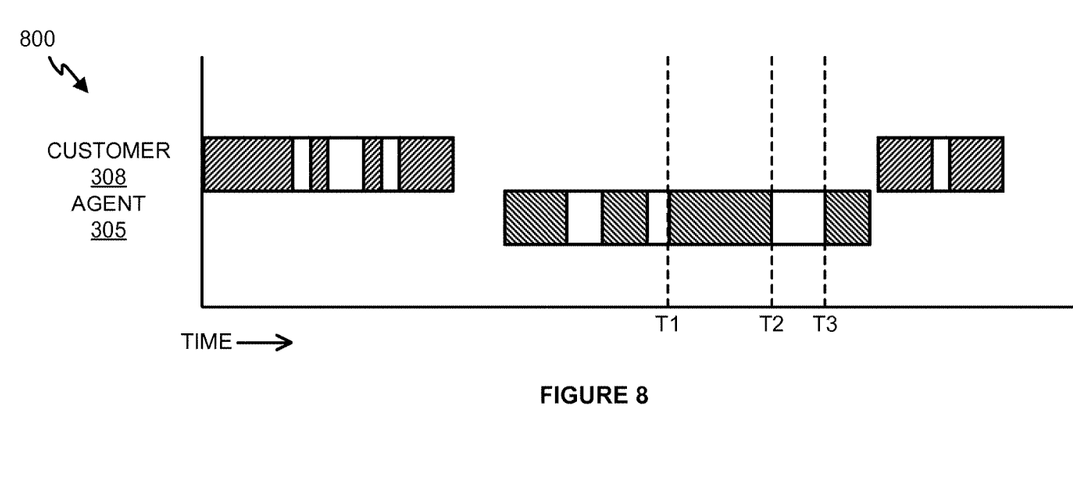
FIG. 8 illustrates a timeline of a conversation for analysis.

FIG. 8 illustrates a timeline 800 of a conversation for analysis. In particular, timeline 800 also represents an example of at least a portion of the conversation discussed above with respect to FIG. 4. Thus, the upper bars of timeline 800 correspond to turns when the customer operating customer device 308 is speaking and the lower bars of timeline 800 correspond to turns when the agent operating agent device 305 is speaking. In this example, two customer turns are illustrated with one agent turn there between. The whitespace within the turns represents pauses in the speaker's speech. The turns illustrated in FIGS. 6 and 7 may also include pauses but the pauses are not shown for clarity in those examples. Conversation analysis system 302 distinguishes between pauses and speech within turns so that conversation analysis system 302 can determine within-floor speech and pause ratios along with maximum speech and pause durations within each turn.

In a specific example, conversation analysis system 302 determines that the agent's turn illustrated on timeline 800 includes three pauses within four periods of speech. One of those pauses is determined to have lasted the amount of time between time T2 and time T3. This amount of time is averaged with the times of the other two pauses within the turn to determine an average within-floor pause duration for that turn. Likewise, one of the speech segments is determined to have lasted the time between time T1 and time T2. That amount of time is averaged with the times of the other three speech segments in the turn to determine an average within-floor speech duration for that turn. In addition to being used for averages calculations, adding the total pause time and the total speech time for the turn allows conversation analysis system 302 to determine a within-floor speech ratio for the turn. Moreover, conversation analysis system 302 is able to determine that the speech duration between times T1 and T2 is the maximum speech duration for that turn and the pause duration between times T2 and T3 is the maximum pause duration for the turn.

The per-turn statistics described above with respect to FIGS. 6-8 are used by conversation analysis system to identify phases of the conversation from which the statistics were derived. The per-turn statistics for each turn may be combined with or compared to per-turn statistics for other turns during the phase identification. Information about the identified phases may then be used to further process the conversation.

Figure 9:
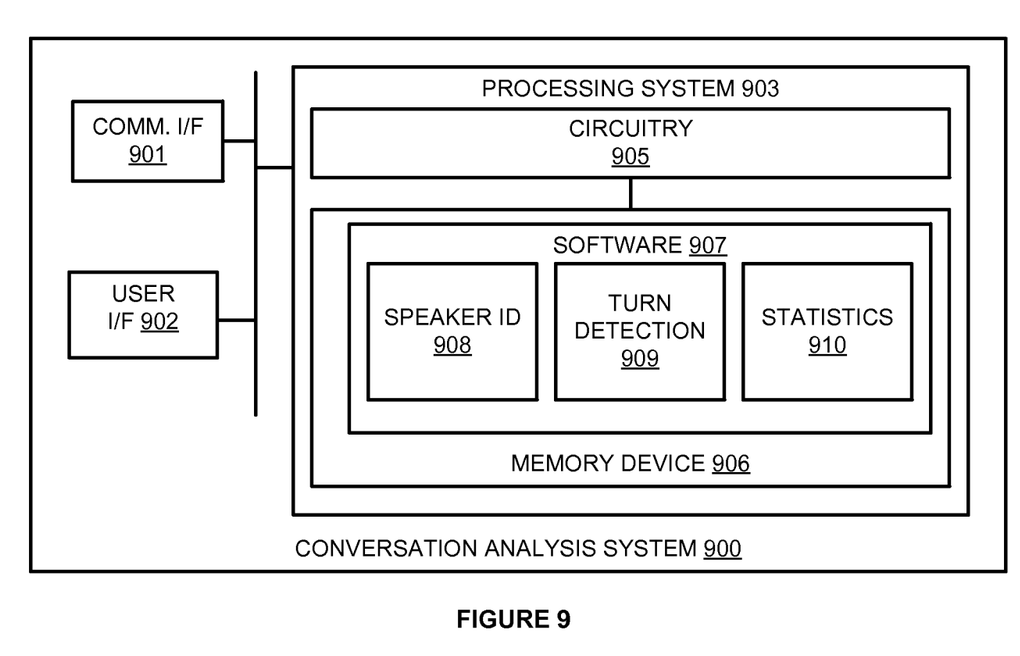
FIG. 9 illustrates a conversation analysis system for analyzing a conversation between a plurality of participants.

FIG. 9 illustrates conversation analysis system 900. Conversation analysis system 900 is an example of conversation analysis systems 100 and 302, although systems 100 and 302 may use alternative configurations. Conversation analysis system 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Operating software 907 comprises computer programs, firmware, or some other form of machine-readable processing instructions. Operating software 907 includes speaker identification module 908, turn detection module 909, and per-turn statistics module 910. Operating software 907 may further include an operating system, utilities, drivers, network interfaces, applications, or some other type of software. When executed by circuitry 905, operating software 907 directs processing system 903 to operate conversation analysis system 900 as described herein.

In particular, speaker identification module 908 directs processing system 903 to determine a first speaker from a plurality of participants and determine a second speaker from the plurality of participants. Turn detection module 909 directs processing system 903 to determine a first plurality of turns comprising portions of the conversation when the first speaker is speaking and determine a second plurality of turns comprising portions of the conversation when the second speaker is speaking Per-turn statistics module 910 directs processing system 903 to determine per-turn statistics for turns of the first and second pluralities of turns and identify phases of the conversation based on the per-turn statistics.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of improving identification of phases of a conversation, between a plurality of participants, in a conversation analysis system by removing the need, during identification of the phases, for computational resources of the conversation analysis system used for speech recognition, comprising:
   in the conversation analysis system, accessing stored digital audio information of audio captured from the plurality of participants by one or more communication devices during the conversation;
   in processing circuitry of the conversation analysis system that processes the stored digital audio information without recognizing words spoken between the plurality of participants using speech recognition to identify phases of the conversation:
      determining a first speaker from the plurality of participants and determining a second speaker from the plurality of participants;
      determining a first plurality of turns comprising portions of the conversation when the first speaker is speaking;
      determining a second plurality of turns comprising portions of the conversation when the second speaker is speaking;
      determining per-turn statistics for turns of the first and second pluralities of turns;
      identifying the phases of the conversation based on the per-turn statistics by applying a statistical model to the per-turn statistics, wherein states of the statistical model correspond to respective ones of the phases of the conversation;
      generating phase information that includes a start time and an end time within the conversation for each one of the phases; and
      identifying a portion of the conversation corresponding to a particular one of the phases of the conversation based on the phase information.

2. The method of claim 1, wherein determining the per-turn statistics comprises:
   determining floor-transfer times between turns of the first plurality of turns and turns of the second plurality of turns; and
   including the floor transfer times in the per-turn statistics.

3. The method of claim 1, wherein determining the per-turn statistics comprises:
   determining within-floor times for the first and second pluralities of turns; and
   including the within floor times in the per-turn statistics.

4. The method of claim 1, wherein determining the per-turn statistics comprises:
   determining within-floor speech ratios for the first and second pluralities of turns, wherein each within-floor speech ratio comprises a ratio of speech time per turn to pause time per turn; and
   including the within-floor speech ratios in the per-turn statistics.

5. The method of claim 1, wherein determining the per-turn statistics comprises:
   determining average within-floor pause durations and maximum within-floor pause durations for the first and second pluralities of turns; and
   including the average within-floor pause durations and the maximum within-floor pause durations in the per-turn statistics.

6. The method of claim 1, wherein determining the per-turn statistics comprises:
   determining average within-floor speech durations and maximum within-floor speech durations for the first and second pluralities of turns; and
   including the average within-floor pause durations and the maximum within-floor pause durations in the per-turn statistics.

7. The method of claim 1, further comprising:
   training the statistical model with conversations having pre-labeled phases.

8. The method of claim 1, wherein at least one of the phases of the conversation comprises a greeting phase in which the first speaker and the second speaker exchange greetings.

9. The method of claim 1, wherein the statistical model comprises a hidden Markov model.

10. The method of claim 1, where identifying the phases of the conversation is further based on workstation activity of the first participant.

11. A conversation analysis system for improving identification of phases of a conversation, between a plurality of participants, in the conversation analysis system by removing the need, during identification of the phases, for computational resources of the conversation analysis system used for speech recognition, comprising:
a storage system configured to store digital audio information of audio captured from the plurality of participants by one or more communication devices during the conversation; and
a processing system configured to access the digital audio information, without recognizing words spoken between the plurality of participants using speech recognition to identify phases of the conversation, to determine a first speaker from the plurality of participants, determine a second speaker from the plurality of participants, determine a first plurality of turns comprising portions of the conversation when the first speaker is speaking, determine a second plurality of turns comprising portions of the conversation when the second speaker is speaking, determine per-turn statistics for turns of the first and second pluralities of turns, identify the phases of the conversation based on the per-turn statistics by applying a statistical model to the per-turn statistics, wherein states of the statistical model correspond to respective ones of the phases of the conversation, generate phase information, generate phase information that includes a start time and an end time within the conversation for each one of the phases, and identify a portion of the conversation corresponding to a particular one of the phases of the conversation based on the phase information.

12. The conversation analysis system of claim 11, wherein the processing system configured to determine the per-turn statistics comprises:
the processing system configured to determine floor-transfer times between turns of the first plurality of turns and turns of the second plurality of turns and include the floor transfer times in the per-turn statistics.

13. The conversation analysis system of claim 11, wherein the processing system configured to determine the per-turn statistics comprises:
the processing system configured to determine within-floor times for the first and second pluralities of turns and include the within floor times in the per-turn statistics.

14. The conversation analysis system of claim 11, wherein the processing system configured to determine the per-turn statistics comprises:
the processing system configured to determine within-floor speech ratios for the first and second pluralities of turns, wherein each within-floor speech ratio comprises a ratio of speech time per turn to pause time per turn and include the within-floor speech ratios in the per-turn statistics.

15. The conversation analysis system of claim 11, wherein the processing system configured to determine the per-turn statistics comprises:
the processing system configured to determine average within-floor pause durations and maximum within-floor pause durations for the first and second pluralities of turns and include the average within-floor pause durations and the maximum within-floor pause durations in the per-turn statistics.

16. The conversation analysis system of claim 11, wherein the processing system configured to determine the per-turn statistics comprises:
the processing system configured to determine average within-floor speech durations and maximum within-floor speech durations for the first and second pluralities of turns and include the average within-floor pause durations and the maximum within-floor pause durations in the per-turn statistics.

17. The conversation analysis system of claim 11, wherein the processing system is further configured to:
train the statistical model with conversations having pre-labeled phases.

18. The conversation analysis system of claim 11, wherein at least one of the phases of the conversation comprises a greeting phase in which the first speaker and the second speaker exchange greetings.

19. The conversation analysis system of claim 11, wherein the statistical model comprises a hidden Markov model.

20. A memory device having instructions stored thereon for improving identification of phases of a conversation, between a plurality of participants, in a conversation analysis system by removing the need, during identification of the phases, for computational resources of the conversation analysis system used for speech recognition, the instructions, when executed by a processing system of the conversation analysis system, direct the processing system to:
access stored digital audio information of audio captured from the plurality of participants by one or more communication devices during the conversation;
from the stored digital audio information, without recognizing words spoken between the plurality of participants using speech recognition to identify phases of the conversation:
determine a first speaker from the plurality of participants and determine a second speaker from the plurality of participants;
determine a first plurality of turns comprising portions of the conversation when the first speaker is speaking;
determine a second plurality of turns comprising portions of the conversation when the second speaker is speaking;
determine per-turn statistics for turns of the first and second pluralities of turns;
identify the phases of the conversation based on the per-turn statistics by applying a statistical model to the per-turn statistics, wherein states of the statistical model correspond to respective ones of the phases of the conversation;
generate phase information that includes a start time and an end time within the conversation for each one of the phases; and
identify a portion of the conversation corresponding to a particular one of the phases of the conversation based on the phase information.

* * * * *